(12) United States Patent
Takamatsu

(10) Patent No.: US 8,296,025 B2
(45) Date of Patent: Oct. 23, 2012

(54) SHIFT RANGE SWITCHING CONTROL APPARATUS

(75) Inventor: Yuuichi Takamatsu, Anjo (JP)

(73) Assignee: Denso Corporation, Kariya (JP)

( * ) Notice: Subject to any disclaimer, the term of this patent is extended or adjusted under 35 U.S.C. 154(b) by 829 days.

(21) Appl. No.: 12/402,701

(22) Filed: Mar. 12, 2009

(65) Prior Publication Data

US 2009/0234530 A1    Sep. 17, 2009

(30) Foreign Application Priority Data

Mar. 12, 2008    (JP) .................................. 2008-062637

(51) Int. Cl.
    *C05D 9/02*    (2006.01)
(52) U.S. Cl. ........................................................ 701/63
(58) Field of Classification Search .................... None
    See application file for complete search history.

(56) References Cited

U.S. PATENT DOCUMENTS

| | | | |
|---|---|---|---|
| 6,230,576 B1 | 5/2001 | Yamada et al. | |
| 2002/0166399 A1 | 11/2002 | Nagasaka et al. | |
| 2003/0217880 A1* | 11/2003 | Isogai et al. | 180/170 |
| 2004/0214688 A1* | 10/2004 | Takasaki et al. | 477/115 |
| 2008/0071882 A1* | 3/2008 | Hering et al. | 709/217 |

FOREIGN PATENT DOCUMENTS

| | | |
|---|---|---|
| JP | 2000-168389 | 6/2000 |
| JP | 2000-170905 | 6/2000 |
| JP | 2002-254941 | 9/2002 |
| JP | 2003-090420 | 3/2003 |
| JP | 2004-019804 | 1/2004 |
| JP | 2005-098429 | 4/2005 |
| JP | 2006-194420 | 7/2006 |
| JP | 2006-006982 | 1/2008 |
| JP | 2008-002561 | 1/2008 |
| JP | 2008-006982 | 1/2008 |

OTHER PUBLICATIONS

Japanese Office Action dated Feb. 23, 2010, issued in corresponding Japanese Application No. 2008-062637, with English translation.

* cited by examiner

*Primary Examiner* — Thomas Tarcza
*Assistant Examiner* — Nagi Murshed
(74) *Attorney, Agent, or Firm* — Nixon & Vanderhye P.C.

(57) ABSTRACT

When a vehicle driver operates a momentary-type gear shift lever and the lever continuously stays for not less than a predetermined length of time at a target gear position, in R, D, and N positions, corresponding to a target shift range of the automatic transmission of a vehicle, a shift range switching apparatus judges that the lever is operated to the target gear position and instructs a DC motor to switch to the target shift range of the automatic transmission. The apparatus detects a "busy shift" (or incomplete) operation of the lever based on voltage signals transferred from vertical/horizontal direction sensors corresponding to the current position of the lever. The apparatus detects the occurrence of the "bush shift" (or incomplete) operation when the gear shift lever is returned to the original position after being operated from the original position toward the target gear shift position, but, does not reach it.

19 Claims, 7 Drawing Sheets

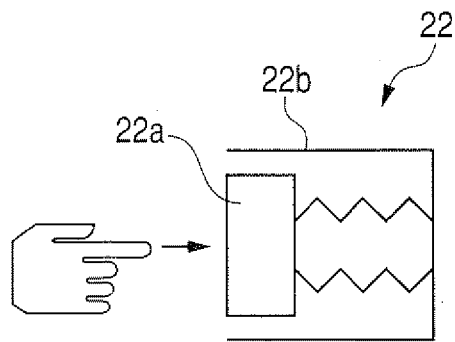
FIG. 7A
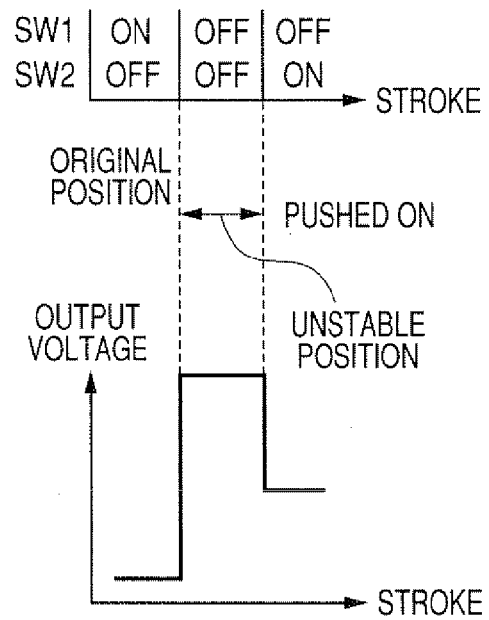
FIG. 7B
FIG. 7C
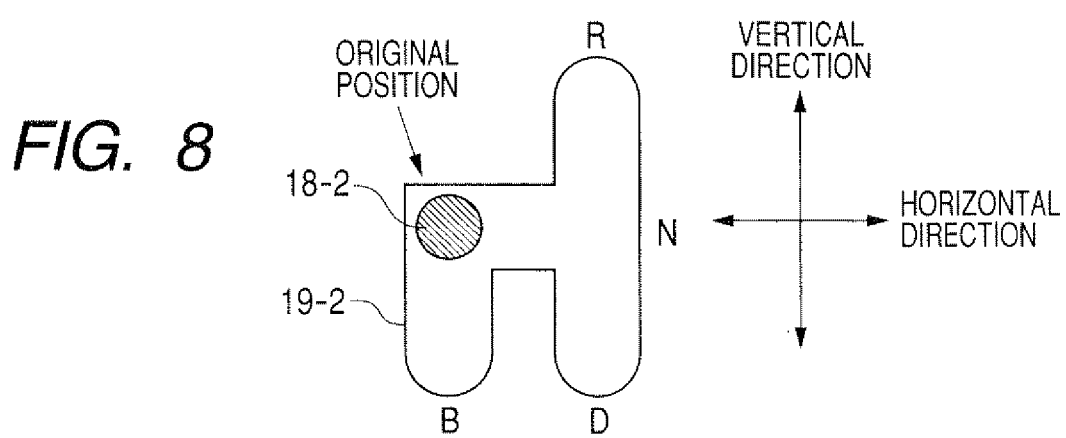
FIG. 8

SHIFT RANGE SWITCHING CONTROL APPARATUS

CROSS-REFERENCE TO RELATED APPLICATION

This application is related to and claims priority from Japanese Patent Application No. 2008-62637 filed on Mar. 12, 2008, the contents of which are hereby incorporated by reference.

BACKGROUND OF THE INVENTION

1. Field of the invention

The present invention relates to a shift range switching control apparatus (or a gear shift switching control apparatus) capable of selecting the current gear in a vehicle automatic transmission system using an actuator and of detecting the driver's operation of the gear shift lever of the vehicle.

2. Description of the Related Art

Various types of a shift range switching control apparatus (or a gear shift switching control apparatus) have been known and used in vehicles. The shift range switching control apparatus switches the shift range (or drive range) of the automatic transmission of a vehicle in response to the driver's operation of the gear shift lever such as a gear stick, a gear selector, a selection lever, and a shift stick. For example, the shift range switching control apparatus has a shift-by-wire type using a direct current (DC) motor as an actuator. When electrically detecting the gear position of the gear shift lever operated by the vehicle driver, the shift range switching control apparatus of a shift-by-wire type instructs the DC motor as an actuator to switch the shift range of the automatic transmission in response to the detected gear position.

Because the shift range switching control apparatus of a shift-by-wire type does not need to mechanically engage the gear shift lever with the shift range for the automatic transmission of the conventional mechanisms and methods capable of directly switching the shift range of the automatic transmission using the gear shift lever directly operated by the vehicle driver, the apparatus of a shift-by-wire type has an advantage which does not limit the location for mounting the shift range switching control apparatus onto the vehicle. For example, related art documents, Japanese patent laid open publications No. JP 2000-170905, and JP 2002-254941 have disclosed the advantage of the shift range switching control apparatus of such a type.

The operation unit, namely, the gear shift lever in the shift range switching control apparatus of the shift-by-wire type has two types, the momentary type (an automatic reset type) and the alternate type (as a manual reset type, or a position retaining type).

The operation unit (the gear shift lever) of the momentary type is operated from its original position to the operation position while the vehicle driver operates, namely, applies a force to the gear shift lever. When the vehicle driver releases the operation unit of the momentary type, the operation unit is automatically returned to its original position. For example, Japanese patent laid open publication No. JP 2002-254941 as a related art technique has disclosed such a mechanism of the operation unit of the momentary type.

On the other hand, the operation unit (the gear shift lever) of the alternate type is operated from the current position to another gear position when the vehicle driver operates, namely, applies a force to the gear shift lever. The operation unit of the alternate type is maintained at its current position even if the vehicle driver releases the operation unit. The operation unit of the alternate type is also used in conventional shift range switching control apparatus.

A related art technique, for example, Japanese patent laid open publication No. JP 2002-254941 has proposed the shift range switching control apparatus of the shift-by-wire type equipped with a CCD camera. This CCD camera monitors the driver's switching operation of the gear shift lever. The system including the shift range switching control apparatus system ignores the operation of the gear shift lever when the gear shift lever is operated contrary to the vehicle driver's will, for example, when the gear shift lever is operated by a vehicle passenger other than the vehicle driver.

Still further, there is another related art technique to ignore the driver's operation of the gear shift lever to switch to the drive (D) position or the reverse (R) position when the vehicle driver does not depress or press down the brake pedal.

The above related art techniques is capable of detecting an obvious error operation contrary to the driver's will and also detecting an obvious error operation caused by combining various driver's operations. However, the shift range switching control apparatus of the above related art techniques cannot detect any driver's incomplete operation (or driver's half-finished operation).

For example, following cases (1) to (3) can be considered as the driver's incomplete operations:

(1) The vehicle driver releases the gear shift lever of the momentary type before the gear shift lever completely reaches a target gear position;

(2) The vehicle driver releases the gear shift lever of the momentary type before the shift range switching control apparatus detects that the gear shift lever reaches the target gear position after the gear shift lever reaches the target gear position; and (3) The vehicle driver releases the gear shift lever of the alternate type on the way to the original position of the gear shift lever after the gear shift lever reaches the target gear position.

In the latter case (3), the shift range switching control apparatus does not detect the operation of the gear shift lever because the gear shift lever is left at an unstable position other than the effective gear positions.

When the driver's incomplete operations (1) to (3) described above occur, the vehicle driver thinks that he has correctly completed the operation of the gear shift lever, but the shift range switching control apparatus does not detect that the gear shift lever has reached the target gear position, and, as a result, does not switch the current gear position to the target gear position. This would cause the driver's vehicle to move in an incorrect direction such as a dangerous direction, and an accident would happen.

SUMMARY OF THE INVENTION

It is an object of the present invention to provide a shift range switching control apparatus of a shift-by-wire type capable of switching to a target shift range (or a target drive range) of the automatic transmission of a vehicle, in particular, capable of detecting a driver's incomplete operation. The shift range switching control apparatus will be referred to as a gear shift switching control apparatus or a gear change switching control apparatus. The shift range switching control apparatus provides a warning to the vehicle driver of the driver's incomplete operation (or driver's half-finished operation), and if necessary, capable of storing information regarding the incomplete operation of a memory device when the apparatus detects the driver's incomplete operation.

To achieve the above purposes, the present invention provides a shift range switching control apparatus having an operation judgment means and an incomplete operation detection means. The operation unit as a gear shift lever is a momentary type, for example. The operation unit of a momentary type is operated by an operator such as a vehicle driver when the operator switches to a target shift range for the automatic transmission of a vehicle onto which the shift range switching control apparatus according to the present invention is mounted. The operation judgment means is capable of judging whether or not the operation unit is operated from the original position to the target position. This target position is an operating position corresponding to the target shift position (target shift range or the target drive range) to be selected. The operation determination position is the position corresponding to the target gear position (or shift range) to be switched. In general, the automatic transmission for a vehicle has a plurality of shift ranges such as the P, N, D, and R shift ranges (P, N, D, and R positions or gears in short). The operation determination position corresponds to each shift range.

The shift range switching control apparatus instructs an actuator to switch to the target shift range (drive range or target gear) corresponding to the operation determination position when the operation judgment means judges that the operation unit (or selection unit) is operated to the operation determination position. In particular, the shift range switching control apparatus has the incomplete operation detection means. This incomplete operation detection means is capable of detecting an occurrence of an incomplete operation of the operation unit (such as the gear shift lever) based on a position detection signal transferred from a detection sensor. The detection sensor generates and outputs the position detection signal in order to specify the current position of the operation unit at one of the original position, the target position, and a unstable position. The target position corresponds to the target shift range to be switched. The unstable position is a position on the way between the original position and the target position.

The incomplete operation detection means detects an occurrence of the incomplete operation of the vehicle driver to the operation unit when the operation unit is returned to its original position after being operated from its original position to the unstable position unless the operation judgment means detects that the operation unit is operated to the target position corresponding to the target shift range to be switched.

According to the shift range switching control apparatus according to the present invention having the above structure, the incomplete operation detection means can detect the occurrence of the incomplete operation by the vehicle driver of the operation unit when the vehicle driver operates the operation unit to switch to the target shift range, but when the vehicle driver inadequately operates or handles the operation unit such as the gear shift lever, because the vehicle driver immediately releases the operation unit, and when the operation judgment means does not judge that the operation unit is completely operated to the operation determination position, and as a result, the shift range is not switched to the target shift range.

In accordance with another aspect of the present invention, there is provided a shift range switching control apparatus having an incomplete operation detection means. The vehicle drover operates the operation unit of a vehicle in order to switch to one of a plurality of shift ranges (or drive ranges) for the automatic transmission of the vehicle. When detecting that the operation unit reaches a target gear shift position corresponding to a target shift range as one of the shift ranges, the shift range switching control apparatus instructs an actuator to switch to the target shift range that corresponds to the detected gear shift position. In particular, the incomplete operation detection means receives a position detection signal transferred from a sensor. The sensor generates and outputs the position detection signal. This position detection signal indicates that the operation unit is at an unstable position on the way between a gear shift position corresponding to one of the shift ranges and a gear shift position corresponding to another one of the shift ranges. The incomplete operation detection means determines the occurrence of a incomplete operation of the operation unit when the operation unit is at the unstable position for not less than a predetermined length of time, based on the position detection signal transferred from the sensor.

According to the shift range switching control apparatus of the present invention, when the vehicle driver intends to switch the shift range, and operate the operation unit such as the gear shift lever toward the target gear position corresponding to the target shift range, but when the operation unit does not reach the target gear position and stays at the unstable position by the driver's inadequate operation of the operation unit, the incomplete operation detection means detects the occurrence of the incomplete operation by the vehicle driver to the operation unit. That is, when the vehicle driver operates the operation unit from one gear shift position to the target gear shift position, but the vehicle driver releases the operation unit on the way toward the target gear shift position before the operation unit reaches the target position, the incomplete operation detection means can detect the occurrence of the incomplete operation by the vehicle driver to the operation unit.

BRIEF DESCRIPTION OF THE DRAWINGS

A preferred, non-limiting embodiment of the present invention will be described by way of example with reference to the accompanying drawings, in which:

FIG. 7A, FIG. 7B, and FIG. 7C each showing another operation of the SBWECU; and

FIG. 8 is a view showing another pattern of the gear shift lever.

DETAILED DESCRIPTION OF THE PREFERRED EMBODIMENTS

Figure 1:
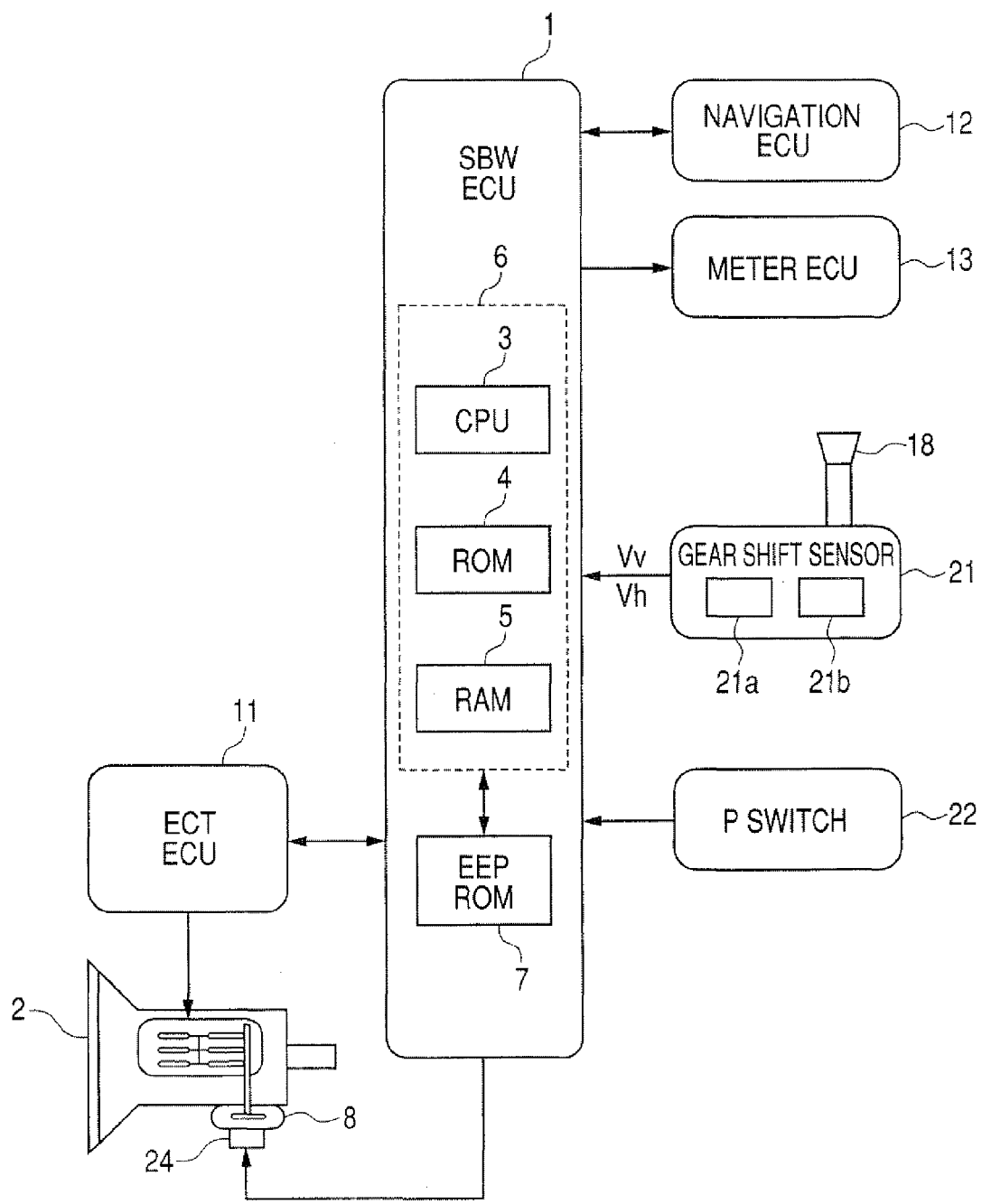
FIG. 1 is a view showing a configuration of a shift-by-wire ECU (SBWECU) 1 and peripheral devices thereof according to embodiments of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of a shift-by-wire ECU (hereinafter, referred to as "SBWECU 1") as the shift range switching control apparatus according to the first embodiment of the present invention with reference to FIG. 1 to FIG. 4. The shift range switching control apparatus will be referred to as a gear shift switching control apparatus or a gear change switching control apparatus.

FIG. 1 is a view showing a configuration of the SBWECU 1 and peripheral devices thereof according to the embodiments of the present invention.

The ECU is an electric control unit mounted to a vehicle. The ECU performs various operation controls in the vehicle. The SBWECU 1 controls the switching operation of the shift range (drive range or gear shift) by the gear shift lever of a shift-by-wire type for the automatic transmission mounted to a vehicle, where the shift ranges include the P lock range (the perking gear lock position), the N range (the neutral gear position), the D range (the forward gear position), and the R range (the reverse gear position). Hereinafter, the P lock range, the N range, the D range, the R range will also be referred to as "P, N, D, and R" in short.

The SBWECU 1 is comprised of an available microcomputer 6 and an EEPROM 7 as a non-volatile memory. Data items stored in the EEPROM 7 are electrically rewritable. The microcomputer 6 has a well-known configuration equipped with a central processing unit (CPU) 3, a read only memory (ROM) 4, a random access memory (RAM) 5, and the like.

As shown in FIG. 1, the SBWECU 1 is electrically connected to various types of devices such as an ECTECU 11, a navigator ECU 12, a meter ECU 13, a gear shift sensor 21, a parking switch (P switch) 22, and an actuator (a motor in the embodiment) as a driving power source. The motor as the driving power source drives a shift range switching assembly 8 for the automatic transmission 2 of the vehicle (not shown).

The ECTECU 11 drives a transmission solenoid assembled in the inside of the automatic transmission 2 when the shift range of the automatic transmission 2 is set to the D (Drive) position (or D range) in order to control the transmission gear ratio of the automatic transmission 2.

The navigator ECU 12 is the electric control unit (ECU) to control the navigation apparatus mounted to the vehicle.

The meter ECU 13 is the electric control unit (ECU) to control various types of display devices assembled to an instrument panel of the vehicle. Those display devices mounted on the instrument panel display various data items of the current condition of the vehicle, for example, the current vehicle speed, the rotation speed of an internal combustion engine, the temperature of a radiator, the current shift range of the automatic transmission 2, and the like.

The gear shift sensor 21 is the sensor capable of detecting the current position of the gear shift lever 18. That is, the vehicle driver handles the gear shift lever 18 that is placed near the driver's seat of the vehicle in order to switch the shift range of the automatic transmission 2.

Figure 2:
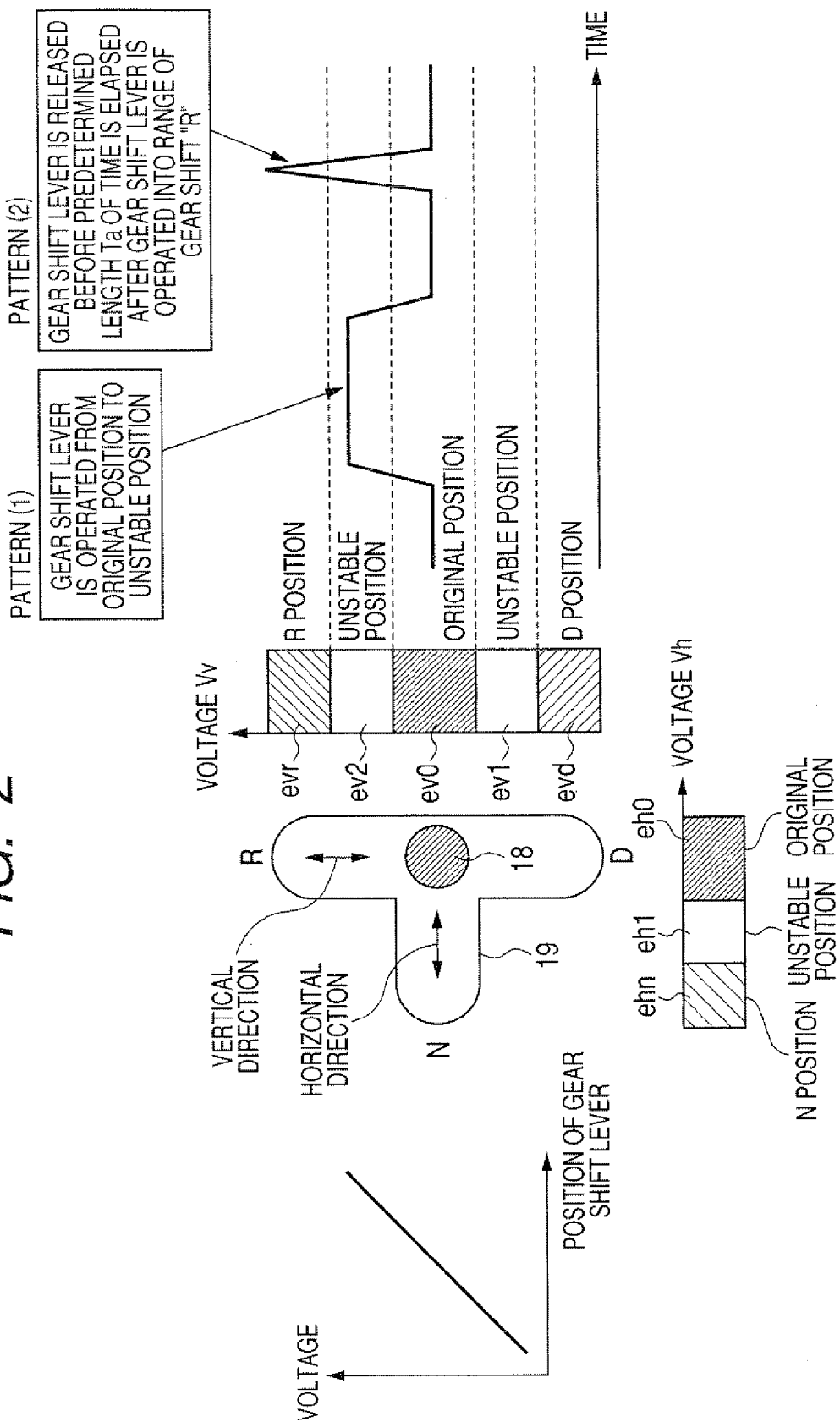
FIG. 2 is an explanatory view showing a gear shift lever, a gear shift gage, and a change of the output voltage of a gear shift sensor in the SBWECU according to the first embodiment of the present invention.

FIG. 2 is an explanatory view showing the gear shift lever 18 in the gear shift gage 19, the position of the gear shift lever 18 detected by the gear shift sensor 21, and the change of the output voltage of the gear shift sensor 21 in the SBWECU 1 according to the first embodiment of the present invention.

As shown in FIG. 2, the gear shift lever 18 is placed and operated in the gear shift gage 19 having a character "T" shape. The vehicle driver handles the gear shift lever 18 to select one of the N, D, and R ranges, other than the P range, along guiding grooves formed in the gear shift gage 19.

In a concrete example, the gear shift gage 19 is composed of the vertical groove and the horizontal groove through which the gear shift lever 18 is moved. The horizontal groove is extended from a central part of the vertical groove. The original position of the gear shift lever 18 is the right side of the horizontal groove and the central position of the vertical groove.

The R gear shift position (hereinafter, referred to as the "R position" or "R gear position") is formed at the uppermost of the vertical groove shown in FIG. 2, and the D gear shift position (hereinafter referred to as the "D position" or "D gear position") is formed at the bottom of the vertical groove. In addition, as shown in FIG. 2, the N gear shift position hereinafter, referred to as the "N position" or "N gear position") is formed at the right side of the horizontal groove. The incomplete position (or intermediate position) between the original position and the D position, the incomplete position between the original position and the R position, and the incomplete position between the original position and the N position are unstable positions or indefinite positions.

The shift sensor 21 is composed of a vertical direction sensor 21a and a horizontal direction sensor 21b. The vertical direction sensor 21a detects the current position of the gear shift lever 18 in the vertical direction, and outputs a voltage corresponding to the detected position. The horizontal direction sensor 21b detects the current position of the gear shift lever 18 in the horizontal direction, and outputs a voltage corresponding to the detected position.

As shown in FIG. 2, the more the gear shift lever 18 is separated from the D position in the gear shift gage 19 (that is, the gear shift lever 18 approaches the R position), the more the output voltage Vv of the vertical direction sensor 21a increases. The more the gear shift lever 18 is separated from the N position in the gear shift gage 19 (that is, the gear shift lever 18 approaches its original position), the more the output voltage Vh of the horizontal direction sensor 21b increases.

Because the gear shift lever 18 is placed at the original position observed along the horizontal direction when the gear shift lever 18 is in any position of the vertical groove in the gear shift gage 19, the output voltage Vh of the horizontal direction sensor 21b becomes its maximum output voltage.

Because the gear shift lever 18 is placed at the original position observed along the vertical direction when the gear shift lever 18 is in any position of the horizontal groove in the gear shift gage 19, the output voltage Vv of the vertical direction sensor 21a becomes an intermediate output voltage between the maximum output voltage and the minimum output voltage thereof. That is, the intermediate output voltage takes an intermediate value between the voltage at the D position and the voltage at the R position.

It is possible to form the gear shift sensor 21 using a potentiometer comprising of a pair of resistance elements, the resistance value of each resistance element is changed in response to the current position of the gear shift lever 18.

The P switch 22 is a push momentary switch (or a push switch) to switch the current shift range of the automatic transmission 2 to the parking range (P range). When the vehicle driver pushes the P switch 22, the P switch 22 outputs a control signal to the SBWECU 1 in order to inform that the vehicle driver pushes the P switch 22.

The shift range switching assembly 8 switches the shift range of the automatic transmission 2 to one of the P range, the N range, the D range, and the R range. The shift range switching assembly 8 is well known. For example, Japanese patent laid open publication No. JP 2000-170905 has disclosed such a shift range switching assembly.

When receiving the signal transferred from the P switch 22 and detects that the vehicle driver pushes the P switch 22, the SBWECU 1 instructs the motor 24 to drive the shift range switching assembly 8 in order to switch the current shift range to the P range of the automatic transmission 2. Still further, when receiving the signal transferred from the gear shift sensor 21 and thereby detecting that the vehicle driver handles the gear shift lever 18 to select one of N range, D range, and R range from the original position of the gear shift lever 18, the SBWECU 1 instructs the motor 24 to drive the shift range switching assembly 8 in order to switch the current shift range to the range of the automatic transmission 2 corresponding to the detected range. The microcomputer 6 performs the above operation of the SBWECU 1.

A description will now be given of the microcomputer 6 in the SBWECU 1 to perform the process of detecting the operation of the gear shift lever 18 in the vertical direction in the gear shift gage 19 with reference to FIG. 3.

The process of detecting the operation of the gear shift lever 18 in the vertical direction in the gear shift gage 19 is repeatedly performed every predetermined period of time.

Figure 3:
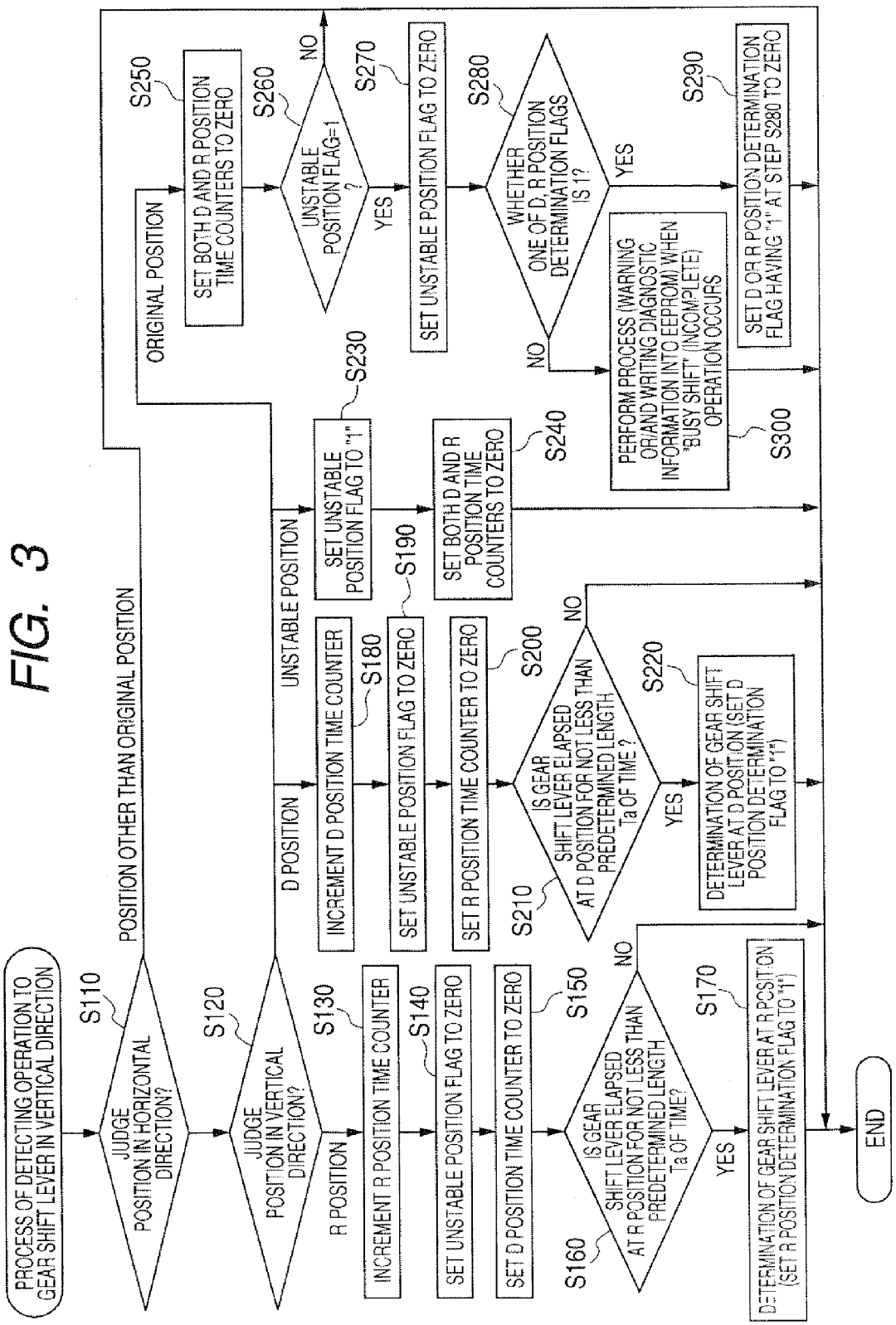
FIG. 3 is a flow chart showing a routine to detect the operation of the gear shift lever along a vertical direction in the gear shift gage according to the first embodiment of the present invention.

FIG. 3 is a flow chart showing the routine to detect the operation of the gear shift lever 18 along the vertical direction in the gear shift gage 19 according to the first embodiment of the present invention.

As shown in FIG. 3, the microcomputer 6 in the SBWECU 1 starts the routine to detect the operation of the gear shift lever 18 in the vertical direction in the gear shift gage 19. At step S110, the microcomputer 6 judges whether or not the gear shift lever 18 stays at its original position based on the output voltage Vh of the horizontal direction sensor 21*b*. That is, the microcomputer 6 judges whether or not the gear shift lever 18 stays in the vertical groove of the gear shift gage 19. The horizontal direction sensor 21*b* forms the gear shift sensor 21. As a concrete example, the microcomputer 6 judges whether or not the output voltage Vh of the horizontal direction sensor 21*b* is within a voltage range eh0, where the voltage range eh0 corresponds to the original position of the gear shift lever 18, as shown in FIG. 2.

When judging that the gear shift lever 18 does not stay at its original position in the horizontal direction in the gear shift gage 19 (step S110), the microcomputer 6 completes this routine to detect the operation of the gear shift lever 18 in the vertical direction in the gear shift gage 19. On the other hand, when the microcomputer 6 judges that the gear shift lever 18 stays at its original position in the horizontal direction (step S110), the operation flow progresses to step S120.

In step S120, the microcomputer 6 judges whether or not the vertical position of the gear shift lever 18 stays at one of the R position, the D position, the original position, and the unstable position in the vertical direction based on the output voltage Vv of the vertical direction sensor. That is, the microcomputer 6 judges the position of the gear shift lever 18 in the vertical direction groove in the gear shift gage 19. By the way, the vertical direction sensor 21*a* forms the gear shift sensor 21.

As a concrete example, the microcomputer 6 judges whether or not the output voltage Vv of the vertical direction sensor 21*a* is within any range of the voltage ranges ev0, ev1, ev2, evr and evd, where each of the voltage ranges ev0, ev1, evr and eve has a predetermined voltage range, the voltage range evh0 corresponds to the original position of the gear shift lever 18 in the vertical direction, the voltage ranges ev1 and ev2 correspond to the unstable position, the voltage range evr corresponds to the R position, and the voltage range evd corresponds to the D position, as shown in FIG. 2.

In step S120, when the microcomputer 6 judges that the gear shift lever 18 stays at the R position (that is, when the output voltage Vv of the vertical direction sensor 21*a* is within the voltage range evr that corresponds to the R position), the operation flow goes to step S130. In step S130, the microcomputer 6 increments the R position time counter. This R position time counter is a counter to count the time length how long the gear shift lever 18 stays at the R position.

Next, at step S140, the microcomputer 6 sets the unstable position flag to zero. The value of the unstable position flag other than zero indicates that the gear shift lever 18 stays at the unstable position. At following step S150, the microcomputer 6 sets the D position time counter to zero. This D position time counter is a counter to count the time length how long the gear shift lever 18 stays at the D position.

Next, in step S160, the microcomputer 6 judges whether or not the gear shift lever 18 stays at the R position for not less than a predetermined length Ta of time based on the value of the R position time counter. In a concrete example, the microcomputer 6 judges whether or not the value of the R position time counter is not less than the value corresponding to the predetermined length Ta of time.

When the judgment result indicates that the gear shift lever 18 does not stay at the R position for not less than the predetermined period Ta of time ("NO" in step S160), the microcomputer 6 completes the routine to detect the operation of the gear shift lever 18 in the vertical direction shown in FIG. 3.

On the other hand, when the microcomputer 6 judges that the gear shift lever 18 stays at the R position for not less than the predetermined period Ta of time ("YES" in step S160), the operation flow goes to step S170.

In step S170, because the microcomputer 6 judges that the gear shift lever 18 is operated to the R position by the vehicle driver, the microcomputer 6 in the SBWECU 1 sets the R position determination flag to the value "1". The microcomputer 6 then completes the routine to detect the operation of the gear shift lever 18 in the vertical direction shown in FIG. 3.

When the microcomputer 6 in the SBWECU 1 detects that the R position determination flag has the value "1" in a shift range switching process (not shown) other than the routine shown in FIG. 3, the microcomputer 6 drives the motor 24 as an actuator to switch the current shift range of the automatic transmission 2 to the R shift range.

In step S120, when the microcomputer 6 judges that the gear shift lever 18 stays at the D position in the vertical direction in the gear shift gage 19, that is when the output voltage Vv of the vertical direction sensor 21*a* is within the voltage range evd that corresponds to the D position, the operation flow goes to step S180. The microcomputer 6 increments the D position time counter.

Next, the microcomputer 6 sets the unstable position flag to zero in step S190. The microcomputer 6 further sets the R position time counter to zero in step S200.

In step S210, the microcomputer 6 judges whether the gear shift lever 18 stays at the D position for not less than a predetermined length Ta of time. In a concrete example, the microcomputer 6 judges whether or not the value of the D position time counter is not less than the value that corresponds to the predetermined length Ta of time.

When judging that the gear shift lever 18 remains in the D position for less than the predetermined length Ta of time ("NO" in step S210), the microcomputer 6 completes the routine to detect the operation of the gear shift lever 18 in the vertical direction.

On the other hand, when the microcomputer 6 judges that the gear shift lever 18 stays at the D position for not less than the predetermined length Ta of time ("YES" in step S210), the operation flow goes to step S220.

In step S220, the microcomputer 6 sets the D position determination flag to the value "1" because the microcomputer 6 judges that the vehicle driver operates the gear shift lever 18 to the D position. The microcomputer 6 in the SBWECU 1 then completes the routine to detect the operation of the gear shift lever 18 in the vertical direction.

When the microcomputer 6 in the SBWECU 1 detects that the D position determination flag has the value "1" in the shift range switching process (not shown), the microcomputer 6 drives the motor 24 to switch the current shift range to the D range of the automatic transmission 2.

In step S120, when the microcomputer 6 in the SBWECU 1 judges that the vertical position of the gear shift lever 18 is at the area of the unstable position, that is, judges that the output voltage Vv of the vertical direction sensor 21a is within the voltage range ev1 or within the voltage range ev2, the operation flow goes to step S230. Both the voltage range ev1 and the voltage range ev2 correspond to the unstable positions in the gear shift gage 19.

In step S230, the microcomputer 6 sets the unstable position flag to the value "1". The operation flow goes to step S240. In step S240, the microcomputer 6 sets both the D position time counter and the R position time counter to zero. The microcomputer 6 then completes the routine to detect the operation of the gear shift lever 18 in the vertical direction in the gear shift gage 19.

By the way, when the microcomputer 6 judges that the vertical position of the gear shift lever 18 stays at its original position in the vertical direction in the gear shift gage 19 (that is, when judging that the output voltage Vv of the vertical direction sensor 21a is within the voltage range ev0 that corresponds to the original position of the gear shift lever 18) in step S120, the operation flow goes to step S250.

In step S250, the microcomputer 6 sets both the D position time counter and the R position time counter to zero.

In step S260, the microcomputer 6 judges whether or not the unstable position flag has the value "1" When the judgment result indicates that the unstable position flag has the value "1" ("YES" in step S260), the operation flow goes to step S270. In step S270, the microcomputer 6 sets the unstable position flag to zero. This case indicates that the gear shift lever 18 is just returned to the original position from the unstable position.

In step S280, the microcomputer 6 judges whether or not at least one of the R position determination flag and the D position determination flag has the value "1". When judging that at least one of the R position determination flag and the D position determination flag has the value "1", the microcomputer 6 sets the determination flag having the value "1" in step S280 to zero (step S290). The microcomputer 6 in the SBWECU 1 then completes the routine to detect the operation of the gear shift lever 18 in the vertical direction in the gear shift gage 19.

When the gear shift lever 18 is returned to its original position through the unstable position in the gear shift gage 19 after the microcomputer 6 judges that the gear shift lever 18 is operated to the R position or the D position in step S170 or S220, the microcomputer 6 performs the series of steps S250 to S290.

On the other hand, when the microcomputer 6 judges that both the R position determination flag and the D position determination flag have not the value "1" in step S280, it can be determined that the gear shift lever 18 is firstly operated from the original position to the unstable position, and is then returned to the original position without reaching the R position or the D position in step S170 or step S220. In this case, the operation flow goes to step S300 because the microcomputer 6 judges that the vehicle driver performs the incomplete operation (as the "busy shift" or half-finished operation) of the gear shift lever 18 with which the shift range is not completely switched. The technical phrase "busy shift" indicates an invalid operation or incomplete operation of the gear shift lever 18 by the vehicle driver.

In step S300, the warning operation is performed to the vehicle driver. The warning operation informs to the vehicle driver that the incomplete operation, namely, the "busy shift" occurs, in other words, the operation of the gear shift lever 18 becomes invalid and of no effect. For example, the microcomputer 6 in the SBWECU 1 instructs the meter ECU 13 to ring buzzer, chimes, or to display the warning message on the display device placed on the instrument panel of the vehicle.

In step S300, the microcomputer 6 also stores diagnostic information indicating the occurrence of the incomplete operation, namely, the "incomplete shift" or the "busy shift" into the EEPROM 7 as a non-volatile memory. The diagnostic information include the operated direction of the gear shift lever 18, time information, mileage information of the vehicle, and position information of the vehicle when the incomplete operation, namely, the "busy shift" is detected.

The microcomputer 6 determines the operated direction of the gear shift lever 18 when the "busy shift" occurs based on the judgment result in step S120 in the routine to detect the operation of the gear shift lever 18 in the vertical direction in the gear shift gage 19. That is, when the microcomputer 6 judges in step S120 that the gear shift lever 18 is operated to the unstable position between the original position and the R position, the "busy shift" of the gear shift lever 18 is performed toward the R position. Similarly, when the microcomputer 6 judges in step S120 that the gear shift lever 18 is operated to the unstable position between the original position and the D position, the "busy shift" of the gear shift lever 18 is performed toward the D position.

It is preferable that the time information has data regarding hour, year, month, and day. For example, it is possible to use the elapsed period of time counted from the time when the ignition switch of the vehicle is turned on. It is possible to receive the time and mileage information from the meter ECU 13, and to obtain the position information of the vehicle from the navigator ECU 12.

After step S300, the microcomputer 6 in the SBWECU 1 completes the routine to detect the operation of the gear shift lever 18 in the vertical direction shown in FIG. 3.

When receiving the request from a diagnosis device (as a diagnosis tool) that is electrically connected to the SBWECU 1 in order to communicate data to each other, the microcomputer 6 transmits the diagnostic information stored in the EEPROM 7 to the diagnosis device. It is possible to use a power-backup volatile memory (so called "backup RAM" or "standby RAM"). In this case, the microcomputer 6 transmits the diagnostic information stored in the power-backup volatile memory when receiving the request from the diagnosis device.

On the other hand, when the judgment result in step S260 indicates that the unstable position flag has not the value "1", because it can be determined that the gear shift lever 18 is placed at the original position, the microcomputer 6 completes the routine to detect the operation of the gear shift lever 18 in the vertical direction.

Figure 4:
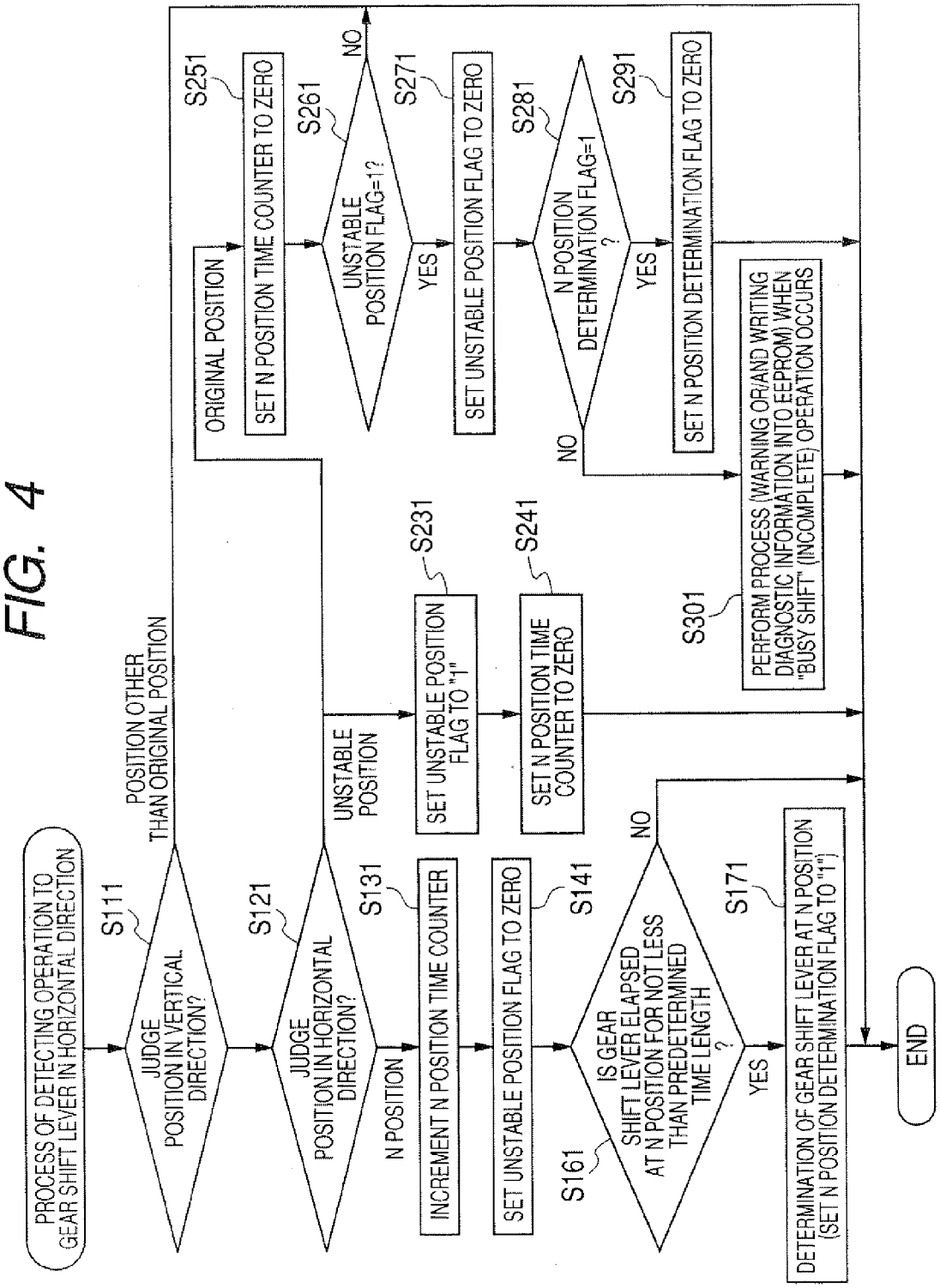
FIG. 4 is a flow chart showing a routine to detect the operation of the gear shift lever along a horizontal direction in the gear shift gage according to the first embodiment of the present invention.

Similar to the routine shown in FIG. 3, the microcomputer 6 in the SBWECU 1 also performs the routine to detect the operation of the gear shift lever 18 in the horizontal direction in the gear shift gage 19, shown in FIG. 4.

FIG. 4 is a flow chart showing the routine to detect the operation of the gear shift lever along the horizontal direction in the gear shift gage 19 according to the first embodiment of the present invention.

The routine shown in FIG. 4 and the routine shown in FIG. 3 are repeatedly performed in parallel every predetermined period of time.

The step in FIG. 4 which is same or similar to the step in FIG. 3 will be referred with a new step number "step number (in FIG. 3)+1".

As shown in FIG. 4, when the microcomputer 6 in the SBWECU 1 starts the routine to detect the operation of the gear shift lever 18 in the horizontal direction, at step S111, the microcomputer 6 judges whether or not the gear shift lever 18 stays at the original position in the vertical direction in the gear shift gage 19 based on the output voltage Vv of the vertical direction sensor 21a. That is, the microcomputer 6 judges whether or not the gear shift lever 18 stays in the groove in the gear shift gage 19 along the horizontal direction. The vertical direction sensor 21a forms the gear shift sensor 21. As a concrete example, the microcomputer 6 judges whether or not the output voltage Vv of the vertical direction sensor 21a is within a voltage range ev0, where the voltage range ev0 corresponds to the original position of the gear shift lever 18, as shown in FIG. 2.

When the microcomputer 6 judges that the gear shift lever 18 does not stay at the original position along the vertical direction in the gear shift gage 19, the microcomputer 6 completes the routine to detect the operation of the gear shift lever 18 along the horizontal direction shown in FIG. 4.

On the other hand, in step S111, when the microcomputer 6 judges that the gear shift lever 18 stays at the original position in the vertical direction in the gear shift gage 19, the operation flow progresses to step S121.

In step S121, the microcomputer 6 judges that the horizontal position of the gear shift lever 18 stays at one of the N position and the unstable position. The horizontal position of the gear shift lever 18 is the position in the groove formed along the horizontal direction in the gear shift gage 19. In a concrete example, the microcomputer 6 judges that the output voltage Vh of the horizontal direction sensor 21b is within one of the voltage range ehn, the voltage range eh0, and the voltage range eh1. The voltage range vhn corresponds to that the gear shift lever 18 is positioned at the N position. The voltage range eh0 corresponds to that the gear shift lever 18 stays at the original position in the gear shift gage 19 along the horizontal direction. The voltage range eh1 corresponds to that the gear shift lever 18 stays at the unstable position (see FIG. 2).

In step S121, when the microcomputer 6 judges that the horizontal direction of the gear shift lever 18 is at the N position (that is, judges that the output voltage Vh of the horizontal direction sensor 21b is within the voltage range ehn that corresponds to the N position of the gear shift lever 18), the operation flow goes to step S131.

In step S131, the microcomputer 6 increments the N position time counter. This N position time counter is a counter to count the time length how long the gear shift lever 18 stays at the N position.

Next, at step S141, the microcomputer 6 sets the unstable position flag to zero. The value of a unstable position flag other than zero indicates that the gear shift lever 18 stays at the unstable position in the gear shift gage 19 along the horizontal direction. The unstable position flag to be read and written in the routine shown in FIG. 4 is different from the unstable position flag to be used in the routine shown in FIG. 3.

Next, in step S161, the microcomputer 6 judges whether or not the gear shift lever 18 stays at the N position for not less than the predetermined length Ta of time based on the value stored in the R position time counter.

When judging that the gear shift lever 18 does not stay at the N position for not less than the predetermined period Ta of time ("NO" in step S161), the microcomputer 6 completes the routine to detect the operation of the gear shift lever 18 along the horizontal direction shown in FIG. 4.

On the other hand, when the microcomputer 6 judges that the gear shift lever 18 stays at the R position for not less than the predetermined period Ta of time ("YES" in step S161), the operation flow goes to step S171.

In step S171, because the microcomputer 6 judges that vehicle driver operates the gear shift lever 18 to the N position, the microcomputer 6 in the SBWECU 1 sets the N position determination flag to the value "1". The microcomputer 6 then completes the routine to detect the operation of the gear shift lever 18 in the horizontal direction shown in FIG. 4.

When the microcomputer 6 in the SBWECU 1 detects that the N position determination flag has the value "1" in the shift range switching process (not shown) other than the routine shown in FIG. 4, the microcomputer 6 drives the motor 24 as an actuator to switch the shift range of the automatic transmission 2 to the N range.

When the microcomputer 6 judges that the gear shift lever 18 stays at the unstable position in the gear shift gage 19 in the horizontal direction (that is, when the output voltage Vh of the horizontal direction sensor 21b is within the voltage range eh1 that corresponds to the unstable position, the operation flow goes to step S231. In step S231, the microcomputer 6 sets the unstable position time counter to the value "1". The operation flow then goes to step S241.

In step S241, the microcomputer 6 sets the N position time counter to zero, and completes the routine to detect the operation of the gear shift lever 18 in the gear shift gage 19 along the horizontal direction, as shown in FIG. 4.

In step S121, when the microcomputer 6 judges whether the gear shift lever 18 stays at the original position in the horizontal direction in the gear shift gage 19 (that is, when the microcomputer 6 judges that the output voltage Vh of the horizontal direction sensor 21b is within the voltage range eh0 that corresponds to the original position), the operation flow goes to step S251. In step S251, the microcomputer 6 sets the N position time counter to zero.

In step S261, the microcomputer 6 judges whether or not the unstable position flag has the value "1". When the judgment result indicates that the unstable position flag has the value "1" ("YES" in step S261), the operation flow goes to step S271.

In step S271, the microcomputer 6 sets the unstable position flag to zero. This case indicates that the gear shift lever 18 is just returned from the unstable position to the original position along the horizontal direction. The operation flow goes to step S281.

In step S281, the microcomputer 6 judges whether or not the N position determination flag has the value "1". When the judgment result indicates that the N position determination flag has the value "1", the microcomputer 6 sets the N position determination flag to zero in step S291. The microcomputer 6 in the SBWECU 1 then completes the routine to detect the operation of the gear shift lever 18 in the gear shift gage 19 along the horizontal direction.

Thus, when the gear shift lever 18 is returned to the original position from the N position through the unstable position in the gear shift gage 19 after the microcomputer 6 judges that the gear shift lever 18 is operated to the N position in step S171, the microcomputer 6 performs the series of steps S251 to S291.

On the other hand, when the microcomputer 6 Judges that the N position determination flag has not the value "1" in step S281, it can be determined that the gear shift lever 18 is firstly operated from the original position to the unstable position in the gear shift gage 19 along the horizontal direction, and is then returned to the original position without judging that the gear shift lever 18 reaches the N position in step S161 (namely, without through step S171). In this case, the operation flow goes to step S301 because the microcomputer 6 judges that the vehicle driver performs the incomplete operation or unstable operation (namely, the "busy shift") of the gear shift lever 18 in the current shift range is not completely switched to the target shift range. The "busy shift" means an invalid operation of the gear shift lever 18 by the vehicle driver.

In step S301 shown in FIG. 4, the microcomputer 6 performs the same operation (warning and storing diagnostic information) in step S300 shown in FIG. 3. The microcomputer 6 in the SBWECU 1 then completes the routine to detect the operation of the gear shift lever 18 in the horizontal direction in the gear shift gage 19.

When the microcomputer 6 judges that the unstable position flag has the value other than "1" in step S261, because the gear shift lever 18 still stays at the original position in the previous process, the microcomputer 6 in the SBWECU 1 completes the routine to detect the operation of the gear shift lever 18 in the gear shift gage 19 along the horizontal direction shown in FIG. 4.

Next, a description will now be given of the control of the SBWECU 1 when the gear shift lever 18 is operated toward the R position in the gear shift gage 19.

Because the operation of the gear shift lever 18 toward the R position is the same of that toward the D position or the N position, the explanation for the operation ofward the D and N positions are omitted here.

When the vehicle driver handles the gear shift lever 18 from its original position toward the R position, and holds it at the R position for not less than the predetermined length Ta of time, the microcomputer 6 in the SBWECU 1 judges that the gear shift lever 18 is operated to and as a result stays at the R position in step S170 shown in FIG. 3. In this case, the microcomputer 3 instructs the DC motor as an actuator to switch the current shift range to the R range of the automatic transmission 2.

On the other hand, in the case of the pattern (1) shown in FIG. 2, when the gear shift lever 18 is operated from the original position to the unstable position (or into the unstable area) which is in the R position side, and the gear shift lever 18 is then returned to the original position without reaching the R position, the microcomputer 6 performs steps S230 and S240 under the judgment to select the condition "NO" in step S260 shown in FIG. 3. After this, the microcomputer 6 performs steps S250 to S280 when the gear shift lever 18 is just returned to the original position without performing any steps S130 to S170 and steps S180 to S220. In this case, the microcomputer 6 judges that the "busy shift" occurs ("NO" in step S280), and performs step S300 to supply warning to the vehicle driver and to store diagnostic information into the memory. The shift range switching control apparatus according to the first embodiment of the present invention can detect the occurrence of the "busy shift" operation (or the incomplete operation) by the vehicle driver in which the vehicle driver operates the gear shift lever 18 from the original position toward the R position, and then releases the gear shift lever 18 before the gear shift lever 18 reaches the R position.

In the case of the pattern (2) shown in FIG. 2, the gear shift lever 18 is operated from the original position to the R position, and returned to the original position from the R position before the predetermined length Ta of time is elapsed, the microcomputer 6 performs the steps S230 and S240 under the judgment of "NO" in step S260 shown in FIG. 3. In this case, the microcomputer 6 performs steps S230 and S240 without performing step S170, and the microcomputer 6 performs the series of steps S250 to S280 when the gear shift lever 18 is returned to the original position. In this case, the microcomputer 6 judges "NO" in step S280, that is, judges that the "busy shift" occurs (namely, the vehicle driver performs the incomplete operation of the gear shift lever 18), and performs the warning process and the diagnostic information storage process in step S300.

The microcomputer 6 detects the occurrence of the "busy shift" when the staying time length of the gear shift lever 18 at the R position is less than the predetermined length Ta of time, that is, when the vehicle driver releases the gear shift lever 18 immediately after the gear shift lever 18 reaches the R position when the vehicle driver operates the gear shift lever 18 from the original position to the R position in the gear shift gage 19.

The SBWECU 1 according to the first embodiment can correctly detect the occurrence of the "busy shift" as the incomplete operation of the gear shift lever 18 when the vehicle driver operates the gear shift lever 18, not enough to be detected by the SBWECU 1, and as a result, no gear shift is performed.

When detecting the occurrence of the "busy shift" operation, the SBWECU 1 informs the occurrence of the "busy shift" operation of the vehicle driver through the speaker device or/and the display device. The vehicle driver thereby recognizes that own operation of the gear shift lever 18 is invalid, and as a result, it prevents the vehicle driver from driving the vehicle toward in an incorrect direction.

The microcomputer 6 in the SBWECU 1 stores the diagnostic information into the memory device such as the EEPROM 7 when detecting the occurrence of the "busy shift". When the "busy shift" by the vehicle driver causes an accident, for example, when the vehicle overruns (that is, the unstable operation of the gear shift lever 18 causes an accident when the vehicle driver misunderstands that he correctly operates the gear shift lever 18, but the shift range is not switched to the target shift range), an inspector retrieves the diagnostic information stored in the EEPROM 7, and finds and specifies the cause of the accident based on the diagnostic information. In other words, the inspector can indicate that the accident is caused by the miss-operation by the vehicle driver (that is, he performed the "busy shift" operation or incomplete operation).

It is in particular possible to easily detect when and where the vehicle driver performs the "busy shift" operation based on the diagnostic information such as the time information, the mileage information, and the position information of the vehicle. This information is effective in investigation and certification of the accident.

In the first embodiment according to the present invention, the microcomputer 6 in the SBWECU 1 judges the correct operation of the gear shift lever 18 based on whether or not the gear shift lever 18 stays at the gear shift position for not less than the predetermined length Ta of time.

The present invention is not limited by the above detection method. For example, it is possible to detect the correct operation of the gear shift lever 18 based only on the voltage output from the gear shift sensor 21 using the predetermined length of time of zero. In this case, the steps S130, S150, S160, S180, S200, S210, S240, and S250 shown in FIG. 3, and steps S131, S161, S241, and S251 shown in FIG. 4 can be eliminated. As a result, only the pattern (1), not the pattern (2) shown in FIG. 2 is detected as the "busy shift" operation.

In the first embodiment described above, the gear shift lever 18 corresponds to the "operation unit", and each of the "R", "D", "N" gear shift positions corresponds to the "operation determination position". The gear shift sensor 21 corresponds to the "detection unit". The steps S110 to S130, S150 to S180, S200 to S220, S240, and S250 shown in FIG. 3, and the steps S111 to S131, S161, S171, S241, and S251 shown in FIG. 4 correspond to the "operation judgment means". The steps S140, S190, S230, and S260 to S290 shown in FIG. 3 and the steps S141, S231, and S261 to S291 shown in FIG. 4 correspond to the "incomplete operation detection means". The steps S300 shown in FIG. 3 and the step S301 shown in FIG. 4 correspond to the "warning means" and the "diagnostic information storage means".

Second Embodiment

A description will be given of the shift-by-wire ECU (SBWECU 1) as the shift range switching control apparatus (as gear shift switching control apparatus or gear change switching control apparatus) according to the second embodiment of the present invention with reference to FIG. 5 to FIG. 8.

Figure 5:
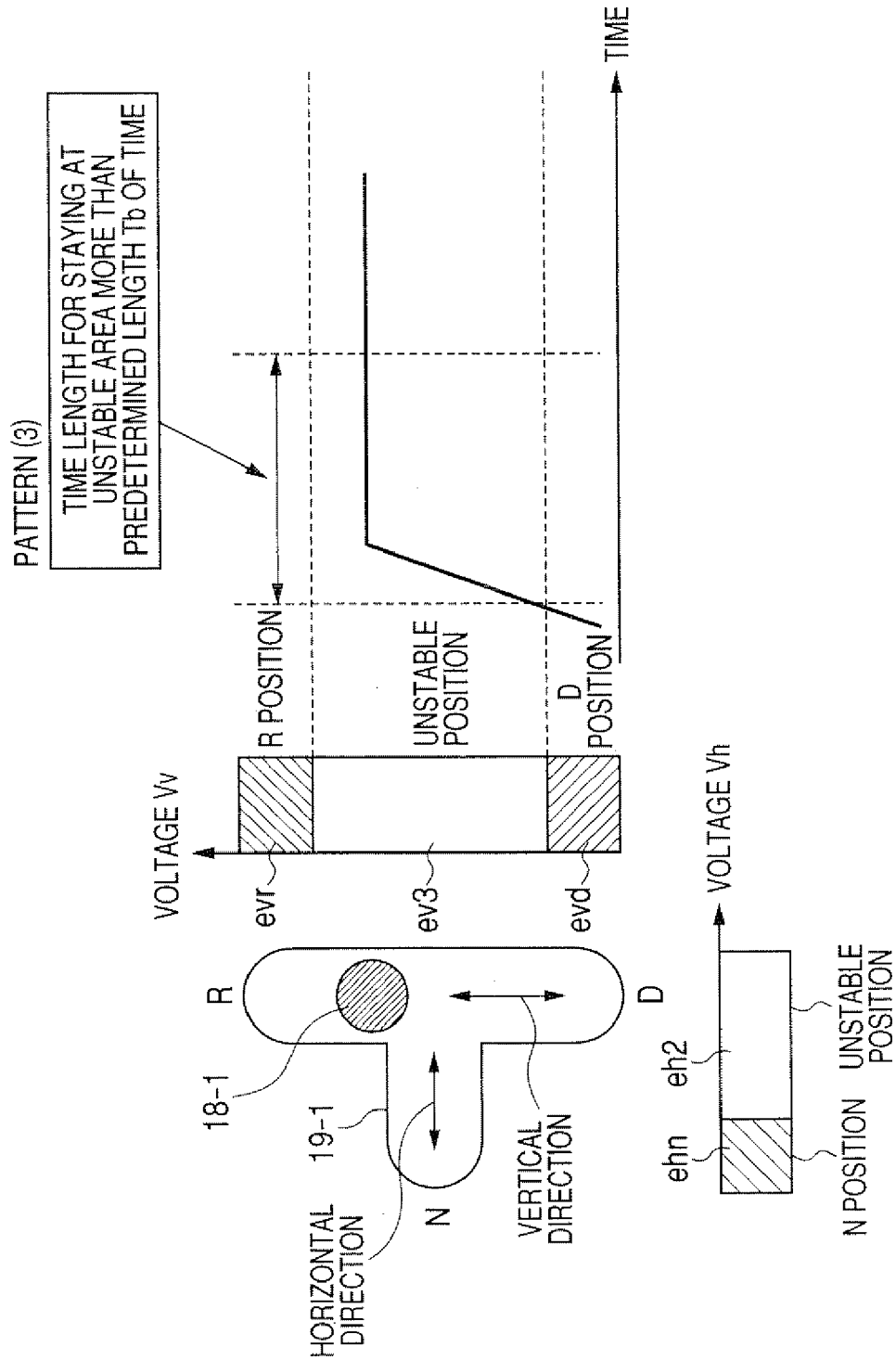
FIG. 5 is an explanatory view showing the gear shift lever in the gear shift gage, and a change of the output voltage of the gear shift sensor in the SBWECU according to the second embodiment of the present invention.

FIG. 5 is an explanatory view showing the gear shift lever 18-1 and the operation of the SBWECU according to the second embodiment of the present invention. In the SBWECU 1 according to the second embodiment, the same components of the SBWECU 1 according to the first embodiment will be referred with the same reference characters and numbers. The difference between the first and second embodiments will be mainly explained.

In the second embodiment, the gear shift lever 18-1 is the alternate type (as a manual reset type or a position retaining type).

As shown in FIG. 5, the gear shift lever 18-1 of the second embodiment has no original position, which is different from the gear shift lever 18 of the momentary type (or the automatic reset type) in the first embodiment. When the vehicle driver operates and then releases the gear shift lever 18-1, the gear shift lever 18-1 stays at the current position and is not returned to any original position. That is, when the vehicle driver operates the gear shift lever 18-1 to one of the R gear shift position, the D gear shift position, and the N gear shift position, and then releases the gear shift lever 18-1, the gear shift lever 18-1 still stays at the current position. Because the gear shift lever 18-1 does not have any original position, the area between the D gear shift position and the R gear shift position is the unstable area in the vertical groove in the gear shift gage 19-1. Similarly, the area other than the N gear shift position in the horizontal direction in the gear shift gage 19-1 is the unstable position.

As shown in FIG. 5, the voltage range "ev3" is the sum of the voltage ranges "ev0", "ev1", and "ev2" shown in FIG. 2. That is, the voltage range of the output voltage Vv of the vertical direction sensor 21a corresponds to the unstable area of the gear shift lever 18-1 in the vertical direction in the gear shift gage 19. Similarly, the voltage range "eh2" is the sum of the voltage range "eh0" and "eh1" shown in FIG. 2, and corresponds to the voltage range of the output voltage Vh of the horizontal direction sensor 21b that corresponds to the unstable position of the gear shift lever 18-1 in the horizontal direction in the gear shift gage 19-1.

In the second embodiment, the microcomputer 6 in the SBWECU 1 judges based on the signals transferred from the shift sensor 21 (composed of the vertical direction sensor 21a and the horizontal direction sensor 21b) that the vehicle driver operates the gear shift lever 18-1 to one of the N gear shift position, the D gear shift position, and the R gear shift position. The microcomputer 6 in the SBWECU 1 performs the following judgment process.

At first, the microcomputer 6 performs the processes steps S120, S130, S150 to S180, S200 to S220, and S240 shown in FIG. 3 in order to judge that the vehicle driver operates the gear shift lever 18-1 to the F position and the R position in the gear shift gage 19-1. In step S120 in the second embodiment, the microcomputer 6 judges whether the vertical direction position of the gear shift lever 18-1 is one of the R position and the D position based on the output voltage Vv of the vertical direction sensor 21a.

In the second embodiment, the microcomputer 6 judges whether the gear shift lever 18-1 is operated to the N position based on the steps S121, S131, S161, S171, and S241 shown in FIG. 4.

In step S121, the microcomputer 6 judges whether the gear shift lever 18-1 is operated along the horizontal direction to the N position or the unstable position based on the output voltage Vh of the horizontal direction sensor 21b. Still further, the microcomputer 6 in the SBWECU 1 repeatedly performs the process shown in FIG. 6 in order to detect the occurrence of the "busy shift" operation.

Figure 6:
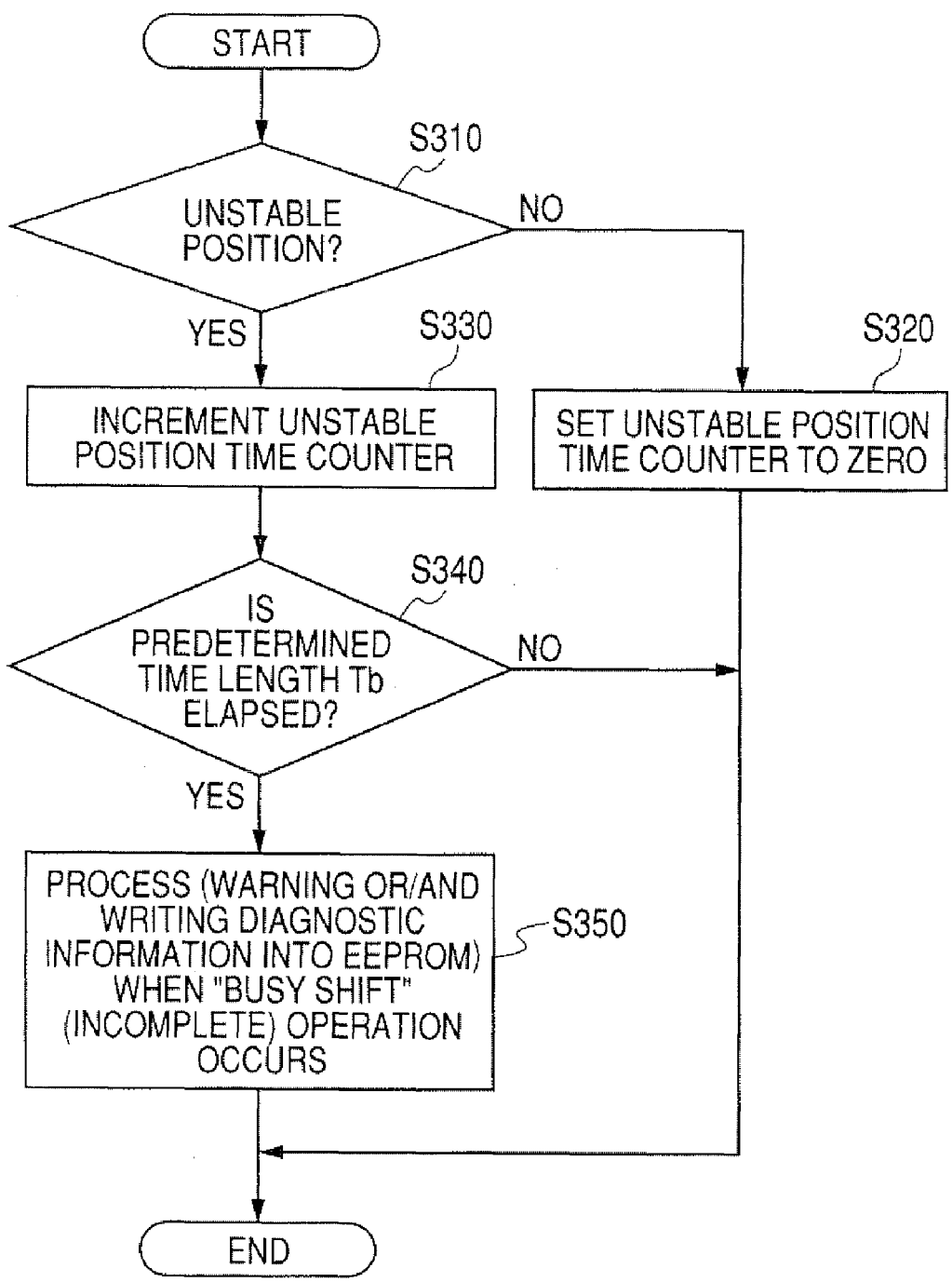
FIG. 6 is a flow chart showing an incomplete shift ("busy shift") operation detection process according to the second embodiment of the present invention.

FIG. 6 is a flow chart showing the "busy shift" operation detection process according to the second embodiment of the present invention.

As shown in FIG. 6, when starting the "busy shift" operation detection process, the microcomputer 6 judges whether or not the gear shift lever 18-1 stays at the unstable position based on the signals transferred from the vertical direction sensor 21a and the horizontal direction sensor 21b. The vertical direction sensor 21a and the horizontal direction sensor 21b form the gear shift sensor 21.

In a concrete example, the microcomputer 6 judges whether or not the output voltage Vv of the vertical direction sensor 21a is within the voltage range "ev3" that corresponds to the unstable position (step S310), and whether or not the output voltage Vh of the horizontal direction sensor 21b is within the voltage range "eh2" that corresponds to the unstable position (step S310). It is also possible for the microcomputer 6 to judge whether or not the output voltage Vv of the vertical direction sensor 21a is not within the voltage ranges "evd" and "evr" that correspond to the D position and the R position, respectively, and whether or not the output voltage Vh of the horizontal direction sensor 21b is not within the voltage range "ehn" that corresponds to the N position.

When the judgment result indicates that the gear shift lever 18-1 does not stay at the unstable position ("NO" in step S310), the operation flow goes to step S320. In step S320, the microcomputer 6 sets the unstable position time counter to zero. The microcomputer 6 then completes the routine to detect the "busy shift" operation detection process shown in FIG. 6. The unstable position time length counter is a counter to detect how long the gear shift lever 18-1 stays at the unstable position.

On the other hand, the microcomputer 6 judges that the gear shift lever 18-1 stays at the unstable position ("YES" in step S310), the operation flow goes to step S330. In step S330, the microcomputer 6 increments the unstable position time length counter. The operation flow then goes to step S340.

In step S340, the microcomputer 6 judges whether or not the gear shift lever 18-1 stays at the unstable position for not less than a predetermined length Tb of time based on the value of the unstable position time length counter. In a concrete example, the microcomputer 6 judges whether or not the value of the unstable position time length counter is not less than the predetermined length Tb of time. It is set so that this predetermined length Tb of time is longer than the time length when the vehicle driver usually operates the gear shift lever 18-1 between the gear shift positions in the gear shift gage 19-1.

When the microcomputer 6 in the SBWECU 1 judges that the gear shift lever 18-1 does not stay at the unstable position for not less than the predetermined length Tb of time ("NO" in step S340), the microcomputer 6 completes the "busy shift" operation detection process shown in FIG. 6.

On the other hand, when the microcomputer 6 judges that the gear shift lever 18-1 stays at the unstable position for not less than the predetermined length Tb of time ("YES" in step S340), the microcomputer 6 judges that the vehicle driver has performed the "busy shift" operation (or the incomplete operation), and the operation flow goes to step S350.

In step S350, the microcomputer 6 performs the same process for the "busy shift" judgment in step S300 shown in FIG. 3 (that is, providing the warning to the vehicle driver and storing the diagnostic information indicating the occurrence of the "busy shift" into the EEPROM 7 as the non-volatile memory. The microcomputer 6 then completes the "busy shift" operation detection process.

The microcomputer 6 in the SBWECU 1 according to the second embodiment judges "YES" in step S340 shown in FIG. 6 when the time length to stay at the unstable position is not less than the predetermined length Tb of time, like the pattern (3) shown in FIG. 5. That is, the microcomputer 6 judges that the vehicle driver has performed the "busy shift" operation (or incomplete operation).

As described above, the SBWECU 1 according to the second embodiment can correctly detect the occurrence of the "busy shift" operation as unstable operation of the gear shift lever 18-1 by the vehicle driver when the vehicle driver operates the gear shift lever 18-1 and releases it at the unstable position in the gear shift gage 19-1, and not enough to be detected by the SBWECU 1 and as a result, no shift range is switched.

When detecting the occurrence of the "busy shift" operation, the SBWECU 1 informs the occurrence of the "busy shift" operation of the vehicle driver through the speaker device or the display device. The vehicle driver thereby recognizes that own operation of the gear shift lever 18 is invalid and he handled the gear shift lever 18 toward an incorrect direction. That is, when the vehicle driver operates the gear shift lever 18-1 from the current gear shift position toward one gear shift position and releases it at the unstable position, namely, when the gear shift lever 18-1 does not reach the target gear shift position, the microcomputer 6 in the SBWECU 1 detects the occurrence of the "busy shift" operation.

The microcomputer 6 detects the occurrence of the "busy shift" when the vehicle driver handles the gear shift lever 18-1 from one gear shift position toward the target gear shift position, but releases it at the unstable position on the way to the target gear shift position.

In the second embodiment of the present invention, when detecting the "busy shift" operation, the microcomputer performs step S350 shown in FIG. 6 to inform the warning to the vehicle driver through the sound device and the display device, and to store the diagnostic information indicating the occurrence of the "busy shift" into the EEPROM 7. Thus, the second embodiment has the same effect of the first embodiment. That is, the SBWECU 1 informs to the vehicle driver that the current operation of the gear shift lever 18-1 by the vehicle driver is invalid. In particular, when the "busy shift" operation of the vehicle driver causes an accident, it is possible to easily specify the cause of the accident based on the diagnostic information stored in the EEPROM 7.

Other Embodiments

For example, it is possible for the SBWECU 1 to detect the "busy shift" operation (namely, the incomplete operation) of the vehicle driver to the parking (P) switch 22, like the detection operation of detect the "busy shift" operation of the gear shift lever 18.

FIG. 7A, FIG. 7B, and FIG. 7C each showing another operation of the SBWECU 1. As shown in FIG. 7A, the vehicle driver pushes the P switch 22. This P switch 22 is composed of the button part 22a and the casing 22b in which the button part 22a is placed. As shown in FIG. 7B, a plurality of position detection switches is placed in the casing 22b. The position detection switches are turned on and off according to the position (as the stroke amount) of the button part 22a in the casing 22b.

In the example shown in FIG. 7A to FIG. 7C, the two switches SW1 and SW2 to detect the position of the P switch 22.

When the button part 22a stays at the original position (namely, when the vehicle driver does not push the P switch 22), the switch SW1 is turned on and the switch SW2 is turned off. When the button part 22a stays at the unstable position, namely, on the way to the bottom part of the casing 22b, both the switches SW1 and SW2 are turned on. Finally, when the button part 22a reaches the bottom part of the casing 22b (namely, the button part 22a is at the switch-on position), the switch SW1 is turned off and the switch SW2 is turned on.

By the way, when it is not necessary to detect any incomplete operation of the P switch 22, it is possible to only use the switch SW2, and to eliminate the switch SW1.

In the case of using both the switches SW1 and SW2, the microcomputer 6 in the SBWECU 1 repeatedly performs the following steps (a) and (b) which are obtained by modifying steps S212 to S301 shown in FIG. 4 in order to detect the operation of the P switch 22.

(a) Instead of the detection process to detect the horizontal direction position of the gear shift lever in step S121, the microcomputer 6 in the SBWECU 1 judges the combination of the switches SW1 and SW2 based on the combination of ON-state and OFF-state of the switches SW1 and SW2 in order to detect the current position of the button part 22a in the casing 22b.

(b) In step S121, when the microcomputer 6 judges that the button part 22a stays at the ON-position, the operation progresses to step S131.

In this case, the N position time counter serves as the counter to count how long the button part 22a stays at the turned ON-position, and the N position determination flag serves as the flag (as the ON-position determination flag) to indicate the vehicle driver pushes the button part 22a into its turned ON-position.

When the judgment result in step S281 indicates that the N position determination flag has the value other than "1", it can be judged that the button part 22a is returned to the original position after the button part 22a is pushed from the original position to the unstable position, not to its turned-ON position. That is, the microcomputer 6 judges that the button part 22a does not reach its turned-ON position in step S171, and the incomplete operation of the vehicle driver to the button part 22a is performed.

It is accordingly for the SBWECU 1 as the shift range switching control apparatus having the above structure to provide the warning (regarding the occurrence of inadequate operation) to the vehicle driver, and to store the diagnostic information into the EEPROM 7 when the SBWECU 1 does not switch the current shift range to the P shift range because the SBWECU 1 does not detect that the vehicle driver pushes the button part 22a when the vehicle driver pushes and quickly releases the button part 22a of the P switch 22.

It is possible to use the sensor shown in FIG. 7C, instead of using the switches SW1 and SW2, capable of outputting three voltage values according to the position of the button part 22a in the P switch 22 in order to judge that the current position of the button part 22a stays at one of its original position and the unstable position.

Still further, it is possible to use a sensor capable of outputting the output voltage which is changed according to the stroke amount of the button part 22a measured from the original position.

FIG. 8 is a view showing another gear shift pattern of the gear shift lever 18-2. It is possible for a vehicle to use another gear shift pattern shown in FIG. 8, instead of the gear shift pattern shown in FIG. 2. As shown in FIG. 8, the gear shift lever 18-2 in the gear shift gage 19-2 is different in pattern from the gear shift lever 18 in the gear shift gage 19 shown in FIG. 2. In other word, the gear shift gage 19-2 shown in FIG. 8 is different in shape from the gear shift gage 19 shown in FIG. 2.

In the shape shown in FIG. 8, like the gear shift position "D", the gear shift position "B" provides a strong driving power to the vehicle to move it forward, but, has a stronger engine braking effect than that of the gear shift position "D" (or the gear position D).

Moreover, because the pattern of the gear shift gage 19-2 shown in FIG. 8 has the need of passing through the N position when the gear shift lever 18-2 is operated from the original position to one of the R position and the D position, it is necessary to set the predetermined length Ta of time for the N position longer in time than another judgment length of time for the B position and the N position, where the microcomputer 6 in the SBWECU 1 judges that the vehicle driver operates the gear shift lever 18-2 to the N position based on the predetermined length Ta of time for the N position.

Still further, it is possible for the SBWECU 1 according to the second embodiment to use the gear shift lever having another shape that is different from the shape of the gear shift lever 18-2 shown in FIG. 5.

OTHER FEATURES AND EFFECTS OF THE PRESENT INVENTION

The shift range switching control apparatus as another aspect of the present invention further has a warning means capable of informing the occurrence of the incomplete operation (namely, the "busy shift" operation) to the driver of a vehicle, on which the shift range switching control apparatus is mounted, when the incomplete operation detection means detects the occurrence of the incomplete operation of the operation unit. It is thereby possible to inform the warning to the vehicle driver when the shift range switching control apparatus does not accept the operation of the operation unit such as the gear shift lever, in other words, when it judges that the driver's operation of the operation unit is invalid. This prevents the vehicle driver causing the incomplete operation as false operation of the operation unit, and also prevents the vehicle moving toward an incorrect direction. For example, the warning means instructs the display device to display the warning regarding the occurrence of the false operation and also instructs the sound device such as a buzzer to sound.

In the shift range switching control apparatus as another aspect of the present invention, the incomplete operation detection means detects the occurrence of the incomplete operation (namely, the "busy shift" operation) to the operation unit when the operation unit is returned to the original position after being operated from the original position to the unstable position without reaching the target position as the operation determination position corresponding to the target shift range to be switched.

The shift range switching control apparatus having the above structure can detect the driver's operation of the operation unit as the incomplete operation (namely the "busy shift" operation) when the operation unit is operated from the original position to the unstable position, and then returned to the original position without reaching the operation determination position.

In the shift range switching control apparatus as another aspect of the present invention, the operation judgment means judges whether or not the operation unit stays at the operation determination position for not less than a predetermined length Ta of time, and the operation judgment means judges that the operation unit is operated to the operation determination position when the judgment result indicates that the operation unit stays for not less than the predetermined length of time at the operation determination position. Thus, according to the operation judgment means that considers the staying time-length condition described above, it is possible for the incomplete operation detection means to detect the occurrence of the incomplete operation of the operation unit when the operation unit is returned to its original position before the operation unit stays at the operation determination position for the predetermined length of time after the operation unit is operated from its original position to the operation determination position. It is thereby possible for the operation judgment means to detect the occurrence of the incomplete operation of the operation unit by the vehicle driver when the staying time length of the operation unit is less than the predetermined length Ta of time because the vehicle driver rapidly releases the operation unit even if the operation unit is operated from its original position to the operation determination position.

Further, according to the operation judgment means considering the condition of the staying time-length described above, it is possible for the incomplete operation detection means to detect the occurrence of the incomplete operation of the operation unit:

(a) when the operation unit is returned to the original position without reaching the operation determination position when the operation unit is operated from the original position to the unstable position; and (b) when the operation unit is returned to the original position before the operation unit continuously stays at the operation determination position for the predetermined length Ta of time after the operation unit is operated from the original position to the operation determination position.

Still further, the shift range switching control apparatus as another aspect of the present invention have a diagnostic writing means that writes diagnostic information regarding the incomplete operation into memory means when the incomplete operation detection means detects the occurrence of the incomplete operation of the operation unit.

According to the shift range switching control apparatus having the diagnostic writing means, an inspector can get the diagnostic information that have been stored in the diagnostic writing means, and the inspector can recognizes whether or not the incomplete operation of the operation unit occurs based on the diagnostic information. For example, if the vehicle driver caused an accident when the vehicle driver performed the incomplete operation of the operation unit, and also misunderstood that the operation of the operation unit was completely done, and as a result, the vehicle moved toward an incorrect direction or overran the safety line on a road, (that is, when the shift range was not switched to the target shift range which the vehicle driver intended switching), the shift range switching control apparatus can provide to the inspector the diagnostic information when the accident occurred, and the inspector obtains and verify the cause of the accident based on the diagnostic information.

It is possible to use, as the memory means, non-volatile memory devices such as EEPROM and flash memories or power-backup volatile memory devices such as backup RAM" or "standby RAM".

In the shift range switching control apparatus as another aspect of the present invention, when the operation unit has a plurality of operation determination positions corresponding to the shift ranges of the automatic transmission of the vehicle, it is preferable for the diagnostic information to include the information regarding the direction to which the operation unit is shifted from the original position or the current position (in other words, the direction to which the vehicle driver operates the operation unit).

Still further, in the shift range switching control apparatus as another aspect of the present invention, the diagnostic writing means writes time information as the diagnostic information into the memory means when the incomplete operation detection means detects the occurrence of the incomplete operation (namely, the "busy shift" operation) to the operation unit. It is thereby possible to investigate the time when the driver performs the incomplete operation of the operation unit based on the time information stored in the memory means. The time information as the diagnostic information is effective in investigation and verification of the cause of the accident.

Still further, in the shift range switching control apparatus as another aspect of the present invention, the diagnostic writing means writes mileage information of the vehicle as the diagnostic information into the memory means when the incomplete operation detection means detects the occurrence of the incomplete operation (namely, the "busy shift" operation) to the operation unit. It is thereby possible to investigate the time when the driver performs the incomplete operation of the operation unit based on the mileage information stored in the memory means. The mileage information as the diagnostic information is also effective in investigation and verification for the cause of the accident.

Moreover, in the shift range switching control apparatus as another aspect of the present invention, the diagnostic writing means writes position information of the vehicle as the diagnostic information into the memory means when the incomplete operation detection means detects the occurrence of the incomplete operation (namely, the "busy shift" operation) to the operation unit. Like, the time information, the mileage information described above, it is possible to investigate the place where the driver performs the incomplete operation of the operation unit based on the position information stored in the memory means. The position information as the diagnostic information is effective in investigation and verification for the cause of the accident.

It is also effective to simultaneously store into the memory means the time information, the mileage information, and the position information when the incomplete operation detection means detects the occurrence of the incomplete operation (namely, the "busy shift" operation) to the operation unit.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A shift range switching control apparatus that instructs an actuator to switch to a target shift range of an automatic transmission mounted to a vehicle when an operation unit of a momentary type is operated in order to switch to the target shift range of the automatic transmission, the shift range switching control apparatus comprising:

an operation judgment unit configured to judge whether or not the operation unit of the momentary type is operated from an original position thereof to a target position as an operation determination position which corresponds to the target shift range to be switched; and an incomplete operation detection unit configured to detect occurrence of an incomplete operation to the operation unit of the momentary type on the basis of a position detection signal transferred from a detection sensor, the detection sensor detecting a current position of the operation unit on the way from the original position to the operation determination position through an unstable position, the unstable position being between the original position to the operation determination position, and the detection sensor outputting the position detection signal, and the incomplete operation to the operation unit being a state in which the operation unit is automatically returned to the original position unless a detection of reaching the operation determination position corresponding to the target shift range to be switched after the operation unit is operated from the original position.

2. The shift range switching control apparatus according to claim 1, wherein the incomplete operation detection unit detects the occurrence of the incomplete operation to the operation unit when the operation unit is returned to the original position from the unstable position after the operation unit is operated from the original position to the unstable position without reaching the operation determination position corresponding to the target shift range to be switched.

3. The shift range switching control apparatus according to claim 1, wherein the operation judgment unit judges whether or not the operation unit continuously stays at the operation determination position for not less than a predetermined length of time, and the operation judgment unit judges that the operation unit is operated and reached to the operation determination position when the judgment result indicates that the operation unit continuously stays over not less than the predetermined length of time at the operation determination position, and the incomplete operation detection unit detects the occurrence of the incomplete operation to the operation unit when the operation unit is returned to the original position before the elapse of the predetermined length of time counted from the time when the operation unit reaches the operation determination position after the operation unit is operated from the original position to the operation determination position.

4. The shift range switching control apparatus according to claim 2, wherein the operation judgment unit judges whether or not the operation unit continuously stays at the operation determination position for not less than a predetermined length of time, and the operation judgment unit judges that the operation unit is operated and reached to the operation determination position when the judgment result indicates that the operation unit continuously stays over not less than the predetermined length of time at the operation determination position, and the incomplete operation detection unit detects the occurrence of the incomplete operation to the operation unit when the operation unit is returned to the original position before the elapse of the predetermined length of time counted from the time when the operation unit reaches the operation determination position after the operation unit is operated from the original position to the operation determination position.

5. A shift range switching control apparatus that instructs an actuator to switch to a target shift range of an automatic transmission mounted to a vehicle when an operation unit is operated to switch to one of a plurality of target shift ranges of the automatic transmission, the shift range switching control apparatus comprising:

incomplete operation detection unit configured to judge occurrence of an incomplete operation to the operation unit when the operation unit stays over not less than a predetermined length of time counted from a time when the gear shift lever is operated on the basis of a position detection signal transferred from a detection sensor, the detection sensor detecting and outputting the position detection signal which indicates that a current position of the operation unit is at an unstable position on the way between a position corresponding to one shift range and a position corresponding to the other shift range.

6. The shift range switching control apparatus according to claim 1, further comprising a warning unit to inform the occurrence of the incomplete operation to an operator of the vehicle when the incomplete operation detection unit detects the occurrence of the incomplete operation to the operation unit.

7. The shift range switching control apparatus according to claim 5, further comprising warning unit to inform the occurrence of the incomplete operation to an operator of the vehicle when the incomplete operation detection unit detects the occurrence of the incomplete operation to the operation unit.

8. The shift range switching control apparatus according to claim 1, further comprising diagnostic writing unit that writes diagnostic information regarding the occurrence of the incomplete operation into memory unit when the incomplete operation detection unit detects the occurrence of the incomplete operation to the operation unit.

9. The shift range switching control apparatus according to claim 5, further comprising a diagnostic writing unit configured to write diagnostic information regarding the occurrence of the incomplete operation into a memory unit when the incomplete operation detection unit detects the occurrence of the incomplete operation to the operation unit.

10. The shift range switching control apparatus according to claim 8, wherein the diagnostic writing unit writes time information as the diagnostic information into the memory unit when the incomplete operation detection unit detects the occurrence of the incomplete operation to the operation unit.

11. The shift range switching control apparatus according to claim 9, wherein the diagnostic writing unit writes time information as the diagnostic information into the memory unit when the incomplete operation detection unit detects the occurrence of the incomplete operation to the operation unit.

12. The shift range switching control apparatus according to claim 8, wherein the diagnostic writing unit writes mileage information of the vehicle as the diagnostic information into the memory unit when the incomplete operation detection unit detects the occurrence of the incomplete operation to the operation unit.

13. The shift range switching control apparatus according to claim 9, wherein the diagnostic writing unit writes mileage information of the vehicle as the diagnostic information into the memory unit when the incomplete operation detection unit detects the occurrence of the incomplete operation to the operation unit.

14. The shift range switching control apparatus according to claim 8, wherein the diagnostic writing unit writes position information of the vehicle as the diagnostic information into the memory unit when the incomplete operation detection unit detects the occurrence of the incomplete operation to the operation unit.

15. The shift range switching control apparatus according to claim 9, wherein the diagnostic writing unit writes position information of the vehicle as the diagnostic information into the memory unit when the incomplete operation detection unit detects the occurrence of the incomplete operation to the operation unit.

16. The shift range switching control apparatus according to claim 8, wherein the diagnostic writing unit writes time information, mileage information of the vehicle, and position information of the vehicle as the diagnostic information into the memory unit when the incomplete operation detection unit detects the occurrence of the incomplete operation to the operation unit.

17. The shift range switching control apparatus according to claim 9, wherein the diagnostic writing unit writes time information, mileage information of the vehicle, and position information of the vehicle as the diagnostic information into the memory unit when the incomplete operation detection unit detects the occurrence of the incomplete operation to the operation unit.

18. A method comprising:

instructing an actuator to switch to a target shift range of an automatic transmission mounted to a vehicle when an operation unit of a momentary type is operated in order to switch to the target shift range of the automatic transmission;

judging, using at least a computer processor, whether or not the operation unit of the momentary type is operated from an original position thereof to a target position as an operation determination position which corresponds to the target shift range to be switched; and detecting occurrence of an incomplete operation to the operation unit of the momentary type on the basis of a position detection signal transferred from a detection sensor, the detection sensor detecting a current position of the operation unit on the way from the original position to the operation determination position through an unstable position, the unstable position being between the original position to the operation determination position, and the detection sensor outputting the position detection signal, and the incomplete operation to the operation unit being a state in which the operation unit is automatically returned to the original position unless a detection of reaching the operation determination position corresponding to the target shift range to be switched after the operation unit is operated from the original position.

19. A method comprising:

instructing an actuator to switch to a target shift range of an automatic transmission mounted to a vehicle when an operation unit is operated to switch to one of a plurality of target shift ranges of the automatic transmission; and judging, using at least computer processor, occurrence of an incomplete operation to the operation unit when the operation unit stays over not less than a predetermined length of time counted from a time when the gear shift lever is operated on the basis of a position detection signal transferred from a detection sensor, the detection sensor detecting and outputting the position detection signal which indicates that a current position of the operation unit is at an unstable position on the way between a position corresponding to one shift range and a position corresponding to the other shift range.

* * * * *